United States

Saglio

[11] 3,739,628
[5] June 19, 1973

[54] ULTRASONIC TESTING OF WELDS
[75] Inventor: Robert Saglio, Massy, France
[73] Assignee: Commissariat A L'Energie Atomique, Paris, France
[22] Filed: June 10, 1971
[21] Appl. No.: 151,718

[30] Foreign Application Priority Data
June 12, 1970 France .................. 7021747

[52] U.S. Cl. .................... 73/67.7, 73/67.8
[51] Int. Cl. ............................. G01n 29/04
[58] Field of Search ............... 73/67.5 R, 67.7, 73/67.8 R, 67.8 S, 67.9

[56] References Cited
UNITED STATES PATENTS
3,274,822  9/1966  Stanya .................. 73/67.9
3,302,453  2/1967  Wood et al. ............ 73/67.7

Primary Examiner—James J. Gill
Attorney—Cameron, Kerkam & Sutton

[57] ABSTRACT

In a method of testing for flaws in metallurgical welds using ultrasonic waves, the interval of time between sending a wave and receiving a flaw echo is made constant by appropriately moving the or each ultrasonic wave sensor relative to the workpiece under inspection, for each measurement. The or each sensor is moved along a rectilinear path forming an angle with the surface of the workpiece which is a function of the angle of incidence of the ultrasonic waves and of the speeds of the waves in the workpiece and the medium above the surface.

12 Claims, 7 Drawing Figures

PATENTED JUN 19 1973 3,739,628

ULTRASONIC TESTING OF WELDS

This invention relates to a method of ultrasonic testing for flaws in metal welds.

It is well known that ultrasonics are now conventionally used for testing welds.

Objections to the initial methods based on such tests were that there was no memory (absence of a record similar to the film obtained in the case of X-ray testing) and that there were difficulties with regard to flaws extending with a particular orientation.

A testing procedure using incident transverse waves with a transmitter-receiver sensor allowing oscilloscope or oscillograph inspection of welds was developed some years ago, but owing to the redistributed energy, i.e., the energy propagated in the workpiece particularly as the result of multiple reflections, stray echoes occurred together with the flaw detection echoes. The respective positions in the oscilloscope or on the oscillograph varied considerably with the point being examined, so that fast localization of the flaws was difficult.

Still more recently, a new ultrasonic testing method has appeared, known as the Delta technique, employing a transverse wave transmitter sensor and a longitudinal wave receiver sensor; this method is relatively insensitive to the orientation of the flaws and provides a permanent record of results, but like the previous method is also subject to the disadvantages due to the presence of stray echoes.

The object of the invention is considerably to attenuate the interference due to stray echoes in the use of various techniques for the oscilloscope or oscillograph ultrasonic inspection of welds.

More specifically, the invention relates to a method of testing metal welds for flaws by the use of ultrasonic waves, wherein the interval of time between each initial echo and any corresponding flaw echo is made constant by appropriately moving the or each ultrasonic wave sensor relative to the workpiece under inspection, for each inspection measurement.

The term "initial echo" denotes the blip or signal on the oscilloscope or oscillograph of an inspection wave at the time of its transmission.

The invention is based on the following observation made by applicants:

The workpiece for testing will be considered, as shown in FIG. 1, as being a flat bar 11 with a weld 12 which is to be inspected with transverse waves. In all the known inspection methods, each sensor 13 is displaced or moved along a trajectory 14 which is conventionally rectilinear and parallel (or perpendicular) to the workpiece 11. Consequently, if an incident transverse wave transmitter-receive sensor is used for inspection, for example, the time between the initial echo and the flaw echo is the time taken for the ultrasonic wave to traverse the path ABCBA. Assuming that the sensor moves from right to left in the direction of the arrow, the path ABCBA decreases uniformly because AB remains constant in a given medium (A′ B′ = AB), while BC decreases constantly (B′ C′ α BC) in another medium.

On an oscillograph, the distance between an initial echo and a flaw echo therefore varies continually, and since the stray echoes may appear at various positions and in varying numbers according to the point under examination, this is the reason for the difficulty in localizing the flaw echo quickly and without error.

Applicants then examined the question whether it would be possible to make the interval of time between each intial echo and the corresponding flaw echo constant by a simple displacement or movement of the sensor other than parallel to the workpiece. In this way the observer could detect the flaw echo practically instantaneously and reliably, despite the presence of stray echoes, as a result of the invariable distance between the blips of the initial echo and flaw echo signals on the oscillograph or the oscilloscope.

Calculations made by applicants in this respect showed that their predictions could be put into effect and that inspection with "a constant path-time" (for a simplified definition of the invention) could be applied generally to all known ultrasonic inspection methods.

Generally, applicants were able to show that in the case of incident transverse waves with a workpiece of a given material (steel, aluminium or some other material) disposed in a given ambient medium (for example water), each sensor must be moved along an oblique rectilinear path forming an angle $\beta$ with the interface, i.e. the surface through which the wave changes its acoustic medium; in addition, the angle $\beta$ is a constant whose value depends on the following:

the value $\alpha$ of the angle of incidence of the transverse waves, the speed $V_{1/water}$ of the longitudinal waves in water, and the speed $V_{tm}$ of the transverse waves in the material.

If use is made of longitudinal waves in the material, as in the Delta technique, in the known inspection method used, the angle $\beta$ also depends upon the speed $V_m$ of the longitudinal waves in the material.

In addition, in the case of weld inspection with longitudinal wave reception, the corresponding sensor for a constant path-time inspection will be displaced along a perpendicular to the interface in such manner that the focus of the sensor is superimposed — in the case of each measurement — on the inspected point of the weld.

Other features and advantages of the invention will be apparent from the following description with reference to the accompanying drawings, which is given by way of example and without any limiting force to explain various applications of the method according to the invention. In the drawings:

FIG. 1, which has already been discussed hereinabove, is a transverse wave inspection diagram according to the prior art.

Figure 1:
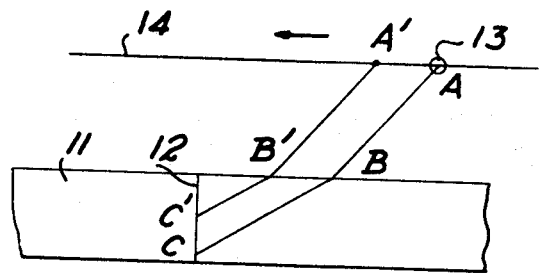
Figure 2:
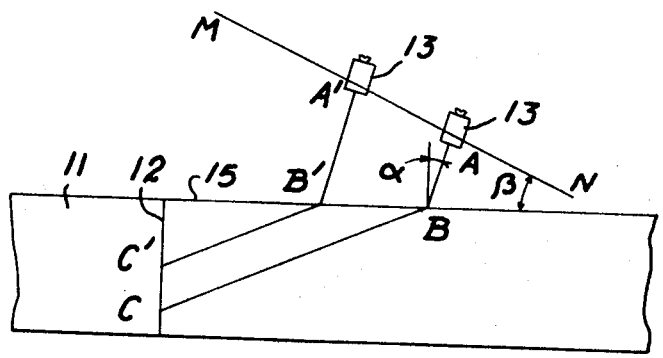
FIG. 2 is a diagram showing transverse wave inspection with a constant path-time in accordance with the invention using a single transmitter-receiver sensor.

Referring to FIG. 2, those elements which are similar to the elements shown in FIG. 1 have been given the same reference numerals; $\alpha$ is the constant angle of incidence and 15 is the interface. For constant path-time inspection, the transmitter-receiver sensor will be moved along the straight line MN, which forms the angle $\beta$ with the interface 15, between two end positions until the entire weld 12 has been covered. The path of a wave is shown for two intermediate positions A and A' of the sensor 13. The time to cover the path ABCBA is the same as that for A' B' C' B' A'. In the case under consideration, with immersion in water, the formula giving the value of $\beta$ is simple; it is given below as an example:

$$\tan \beta = \cotan \alpha \ 1/(V_{tm}2/2 - 1$$
$$V_{1/water}$$

Assuming that the angle of incidence $\alpha$ is equivalent to a 60° transverse wave BC, the values found for the wave speeds and the angles are as follows:
with a steel workpiece:

$$\alpha = 23° \ 30'$$
$$V_{1/water} = 1483 \text{ m/s}$$
$$V_{tm} = 3230 \text{ m/s}$$
$$\beta = 31°35'$$

with an aluminium workpiece:

$$\alpha = 24° \ 30'$$
$$V_{1/water} = 1483 \text{ m/s}$$
$$V_{tm} = 3080 \text{ m/s}$$
$$\beta = 34°55'$$

Figure 3:
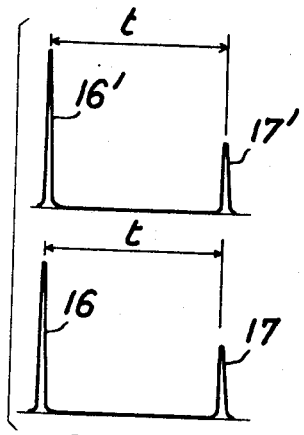
FIG. 3 is a portion of an oscillograph obtained with the inspection method shown in FIG. 2.

Referring to FIG. 3, the two sections of an oscillograph corresponding respectively to the paths ABCBA, A'B'C'B'A', are shown one beneath the other. The initial echo blips have the references 16 and 16' and the flaw echoes have the references 17 and 17'; the distances between the blips 16 and 17, and 16' and 17' respectively are the same and correspond to a constant path-time $t$. Flaw identification is thus facilitated despite the presence of stray echoes.

Of course this arrangement is still applicable to contact inspection, in which case a wedge is interposed between the sensor and the workpiece, the material and angle of the wedge being selected to comply with the constant path-time rule.

Figure 4:
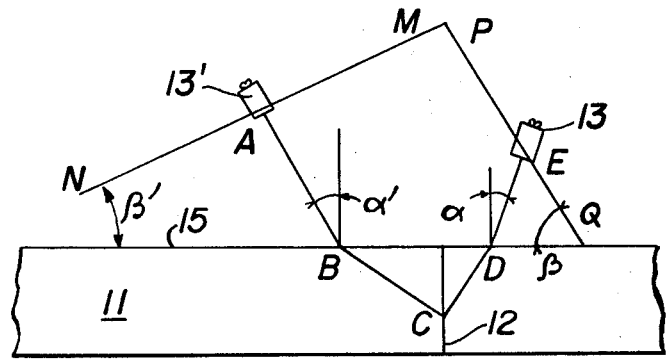
FIG. 4 is a diagram of the same type of inspection but with two transmitter-receiver sensors.

Transverse wave inspection can be carried out with two transmitter-receiver sensors connected in parallel with the ultrasonic wave generator; the invention is also applicable to this case and FIG. 4 shows the diagram of the arrangement required.

The sensor 13 moves along the straight line PQ forming an angle $\beta$ with the interface 15 so that given an angle of incidence $\alpha$ for the transmitted wave the time $t_1$ of the path EDCDE remains constant.

The sensor 13' moves along the straight line MN at an angle $\beta'$ and an angle of incidence $\alpha'$, so that the time $t_2$ of the path ABCBA remains constant.

Figure 5:
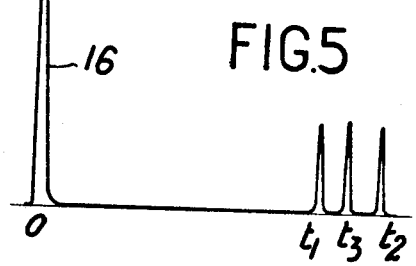
FIG. 5 is a portion of an oscillograph obtained with the inspection method shown in FIG. 4.

The corresponding oscillograph, a section of which is shown in FIG. 5, can give three indications on a flaw:
the first for the time $t_1$
the second for the time $t_2$
the third for a time $t_3 = (t_1 + t_2)/2$
corresponding to a direct reflection.

All these times are counted from the time 0 of the blip 16 of the initial echo.

Thus each inspected point of the weld will always comprise three recordings which are always in the same relative positions of an oscillograph in relation to an initial echo blip, and these three recordings give information as to the form and orientation of the flaw; the best results are obtained when BC and DC are perpendicular, i.e., when the angles of the two transverse waves DC and BC are complimentary. It is also possible to make $t_2$ equal to $t_1$ and hence to $t_3$. The three flaw echo blips are then superimposed.

The advantage of a transverse wave inspection using two sensors is to increase the reliability for the detection of a flaw irrespective of its orientation.

Figure 6:
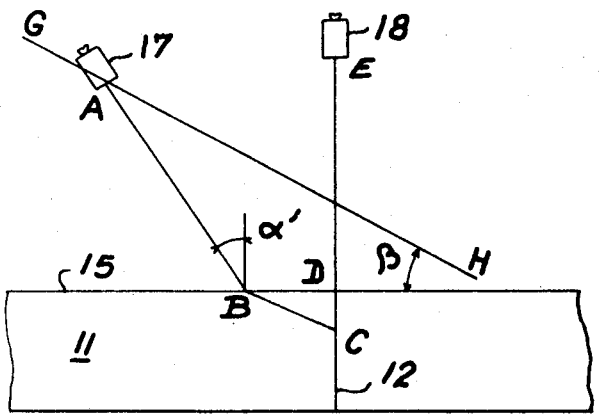
FIG. 6 is an application of the constant path-time inspection method to the Delta technique and FIG. 7 is an application of the constant path-time inspection method to a combined transverse and longitudinal wave inspection method using the Delta technique.

FIG. 6 shows application of the constant path-time principle to the Delta inspection technique using a transmitter sensor and a receiver sensor which are separate from one another. In this Figure reference 17 denotes the transmitter sensor and reference 18 the receiver sensor. To comply with the principle of the invention it is necessary and sufficient for the path ABCDE to be constant irrespective of the point C under examination.

A focusing receiver sensor is used and is moved along the perpendicular to the interface in such manner that the point of the weld under examination is always at the sensor focus; a calculation slightly more complicated than before can then be used to prove that for a given angle of incidence $\alpha$ the transmitter sensor 17 must always move along a straight line GH forming an angle $\beta$ with the interface 15.

It is also demonstrated that the ratio $\gamma$ of the speeds of movement of the two sensors depends on the materials under inspection aluminium on the angle of incidence $\alpha$; these movements are obtained by mounting each sensor on a screw thread and the ratio of the two screw threads which will rotate at the same speed will be equal to $\gamma$.

If the angle $\alpha$ is given the optimum value corresponding to a given material, the values found in the case of steel and aluminum are as follows:
Steel workpiece:

$$\alpha = 23°30'$$
$$V_{1/water} = 1483 \text{ m/s}$$
$$V_{tm} = 3230 \text{ m/s}$$
$$V_{1m} = 5900 \text{ m/s}$$
$$\beta = 41°50'$$
$$\gamma = 1.033$$

the transmitter screw thread pitch being greater than that of the receiver.
Aluminium workpiece:

$$\alpha = 24°30'$$
$$V_{1/water} = 1483 \text{ m/s}$$
$$V_{tm} = 3080 \text{ m/s}$$
$$V_{1m} = 6300 \text{ m/s}$$
$$\beta = 43°10'$$
$$\gamma = 1.042$$

With the Delta technique the detection of the flaw could be improved and the corresponding signal can be increased by using a plurality of transmitters, for example two which move symmetrically in relation to the path followed by the receiver.

Figure 7:
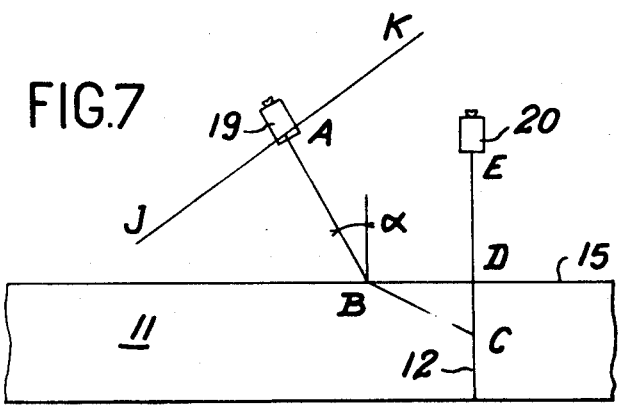

As a final example of the application of the invention FIG. 7 is a diagram of the system used for a combined longitudinal and transverse wave inspection using the Delta technique. Two transmitter-receiver sensors are used which are connected in parallel with the ultrasonic wave generator.

Sensor 19 operates by producing transverse waves in the material under inspection and moves along the straight line JK forming an angle $\beta$ with the interface 15; the duration of the path ABCBA is constant and is equal to $t_1$. The angle $\beta$ is calculated as in the case of FIG. 2.

The sensor 20 operates with longitudinal waves, and moves perpendicularly to the interface 15 so that the duration of the path EDCDE is constant and equal to $t_2$.

The system comprising the two sensors 19 and 20 is mounted in the Delta configuration and can also operate with a constant path-time ABCDE since this time $t_3$ is equal to $(t_1 + t_2)/2$.

Consequently, any flaw — depending upon its nature and orientation — may be indicated by one, two or three signals, thus reinforcing the possibilities of detection. If required, $t_1$ may be equal to $t_2$ and to $t_3$, resulting in a generally stronger single signal.

In all the systems described, all the signals may of course be treated so as to be processed separately or simultaneously. When there are a plurality of sensors in parallel, each sensor can be provided with a preamplifier, an attenuator, or any other device to give an identical response in the case of flaws which are identical but which are situated at different depths.

I claim:

1. A method of testing for flaws in metallurgical welds by ultrasonic wave inspection using a sensor comprising a transmitter and receiver or unitary transmitter receiver moved toward and away from the weld, wherein the interval of time between each initial echo and any corresponding flaw echo is made constant for each inspection measurement by moving at least one ultrasonic wave sensor relative to the workpiece under inspection along a rectilinear path forming a constant angle $\beta$ with the surface of said workpiece, angle $\beta$ being a function of the angle of incidence $\alpha$ of incident transverse waves, of the speed $V_1$ of the longitudinal waves in the medium above the surfce of the workpiece, and of the speed $V_{tm}$ of the transverse waves in the material of the workpiece.

2. A method according to claim 1 wherein said workpiece is steel and said medium is water, $\alpha$ is given an optimum value of 23°30′, $\beta$ is of the order of 31°.

3. A method according to claim 1 wherein said workpiece is aluminium and said medium is water, $\alpha$ is given an optimum value of 24°30′, $\beta$ is of the order of 34°.

4. A method according to claim 1, wherein two transmitter-receiver sensors are used which operate with transverse waves which are orthogonal to one another.

5. A method according to claim 1, wherein two transmitter sensors are used, the first of which operates with transverse waves with a constant path-time at a sensor displacement angle $\beta$, the second operates with longitudinal waves with a constant path-time and moves normally to said surface, while the two sensors operate in a coupled relationship in accordance with the Delta technique and also with the constant path-time.

6. A method of testing for flaws in metallurgical welds by ultrasonic wave inspection using a transmitter sensor and a receiver sensor moved toward and away from the weld wherein the interval of time between each initial echo and any corresponding flaw echo is made constant for each inspection measurement by moving at least one ultrasonic wave sensor relative to the workpiece under inspection along a rectilinear path forming a constant angle $\beta$ with the surface of said workpiece, angle $\beta$ being a function of the angle of incidence $\alpha$ of incident transverse waves, of the speed $V_1$ of the longitudinal waves in the medium above the surface of the workpiece, and of the speed $V_{tm}$ of the transverse waves in the material of the workpiece using the Delta inspection technique and wherein the transmitter sensor is moved along the straight line forming an angle $\beta$ with the surface and the angle $\beta$ is also dependent upon the speed $V_{1m}$ of the longitudinal waves in the material of the workpiece under inspection.

7. A method according to claim 6, wherein the receiver sensor is a focusing sensor operating with its focus superimposed on the weld point under inspection.

8. A method according to claim 7, wherein the receiver sensor is moved perpendicularly to the surface.

9. A method according to claim and 7, wherein the transmitter sensor comprises two transmitter elements moving symmetrically in relation to the path, perpendicular to said surface, followed by the focusing receiver sensor.

10. A method according to claim 6, wherein the ratio of the respective speeds of displacement of the transmitter and receiver sensors is a constant $\gamma$ for a given material under inspection and for a given value of the angle of incidence $\alpha$.

11. A method according to claim 10, wherein said workpiece is steel and said medium is water, $\alpha$ is equal to 23°30′, $\beta$ is of the order of 41° and $\gamma$ is equal to 1.033.

12. A method according to claim 10, wherein said workpiece is aluminium and said medium is water, $\alpha$ is equal to 24°30′, $\beta$ is of the order of 43° and $\gamma$ is equal to 1.042.

* * * * *